United States Patent [19]

Alcorn

[11] Patent Number: 4,912,776

[45] Date of Patent: Mar. 27, 1990

[54] PROCESS FOR REMOVAL OF $NO_x$ FROM FLUID STREAMS

[75] Inventor: William R. Alcorn, Cleveland Hts., Ohio

[73] Assignee: W. R. Grace & Co.-Conn., New York, N.Y.

[21] Appl. No.: 29,438

[22] Filed: Mar. 23, 1987

[51] Int. Cl.$^4$ .......................... B01J 8/00; C01B 21/00
[52] U.S. Cl. .................................................. 423/239
[58] Field of Search ............................ 423/239, 239 A

[56] References Cited

U.S. PATENT DOCUMENTS 3,279,884  10/1966  Nonnenmacher et al. ......... 423/239
4,351,811   9/1982  Matsuda et al. .................... 423/239

Primary Examiner—Gregory A. Heller
Attorney, Agent, or Firm—Edward J. Cabic

[57] ABSTRACT

There is provided a process and apparatus for carrying out the process, to remove nitrogen oxides from a gas stream. The process is characterized by passing the gas stream through a first catalytic zone in the absence of added ammonia and in the presence of an oxidation catalyst to convert the NO content thereof to $NO_2$, thereafter introducing ammonia into the gas stream, and catalytically reducing the $NO_2$ to nitrogen and water in the presence of a catalyst. Higher conversion to innocuous materials is obtained.

34 Claims, 1 Drawing Sheet

PROCESS FOR REMOVAL OF $NO_x$ FROM FLUID STREAMS

This invention relates to a process for the catalytic treatment of fluid streams to remove $NO_x$ therefrom. In general, there is provided a 2-stage catalytic process with ammonia injected between the first and second stages; the first stage is operated at sufficiently low temperature to promote high conversion to $NO_2$. Staging as provided herein avoids formation of $NH_4NO_3$. The catalyst may be in any form, including monolith. More particularly, this invention relates to a process for the sequential treatment of a fluid stream containing $NO_x$ first with an oxidizing catalyst to convert lower oxides of nitrogen such as NO and $N_2O$ to $NO_2$, followed by addition of ammonia, and then followed by treatment with a reducing catalyst to convert the $NO_2$ to nitrogen and water.

BACKGROUND OF THE INVENTION AND PRIOR ART

This disclosure concerns a new selective catalytic reduction process for the conversion of nitrogen oxides ($NO_x$) in the presence of oxygen in exhaust gases from stationary or moving sources (power plants, internal combustion engines (compression or spark ignited), lean-burn engines, industrial processes, etc.) to harmless gases.

Much research effort has been expended in attempting to remove, or at least materially reduce, the $NO_x$ content of effluent gases, particularly exhaust gases from internal combustion engines, e.g., automobile engines. High compression engines, especially diesel engines, produce unacceptably high concentrations of $NO_x$ in the exhaust, and environmental considerations have mandated the removal of such oxides of nitrogen to an acceptable level.

Catalytic treatment of fluids containing $NO_x$ to lower the content of these oxides in the effluent gas is not new per se. For a substantial treatise on the subject, reference may be had to the book "Nitrogen Oxides, Control and Removal-Recent Developments" by L. H. Yaverbaum, Noyes Data Corp., 1979 which summarizes many of the recently issued U.S. Patents in this field. Catalytic converters for use in the exhaust lines of internal combustion engines are now commonplace. Most usually these consist of a honeycomb of ceramic, or corrugated thin metal strips fan-folded or spirally wrapped, and having a catalyst or catalysts deposited on the surface or surfaces of the supporting device. The exhaust gas is conducted through the "honeycomb" where contact with the catalyst or catalysts is effected and various pollutants chemically or physically altered to environmentally acceptable components before discharge into the atmosphere.

Several technical solutions have been proposed to reduce $NO_x$ emissions from stationary sources with oxygen present, and many have been put into operation. These include combustion modifications, gas scrubbing, noncatalytic reduction, nonselective catalytic reduction, and selective catalytic reduction (SCR).

SCR processes have been documented in literature and patents for several years. These involve mixing ammonia gas with hot exhaust gases prior to flow through a catalytic packed bed or monolith converter wherein an overall reaction such as (1) is carried out at better than 80% conversion:

$$4NH_3 + 6NO \rightarrow 5N_2 + 6H_2O \quad (1)$$

Reaction (1) is not exact, nor is it representative of a specific single surface reaction. Other products such as $N_2O$ and $NO_2$ may be made.

There is no universal agreement about the fundamental reaction steps in the SCR, i.e., the reaction mechanism, and it may differ depending on catalyst type and temperature as well as gas composition. However, evidence seems to support a two-step process where reactions (2) and (3) occur in parallel.

$$NO + \tfrac{1}{2}O_2 \rightarrow NO_2 \quad (2)$$

$$6NO_2 + 8NH_3 \rightarrow 7N_2 + 12H_2O \quad (3)$$

Various authors have noted that the reduction of NO requires the presence of oxygen and that the reduction of $NO_2$ does not, and the latter is a much easier reaction to carry out. It is believed that reaction (2) is the rate limiting step. However, all SCR processes disclosed so far involve passing the ammonia/exhaust gas mixture over a catalyst bed such that the above reactions must occur in parallel on the same catalyst under the same operating conditions in order to achieve overall reaction (1).

Many catalysts have been disclosed for SCR processes. One useful classification is between noble and base metals. SCR processes with noble metals (Pt, mainly) can run at lower temperatures and higher space velocities than those using base metals. Noble metal processes, typically run in the 180°–250° C. range, are limited on the low end by a tendency to form the potentially explosive ammonium nitrate and on the high end by a tendency to oxidize ammonia back to $NO_x$. Base metal processes, typically run at 300°–450° C., are limited by rate on the low end and ammonia oxidation on the high end.

The thermodynamic equilibrium of reaction (2), believed to be the rate-limiting step, has an important effect on the reaction rate. Equilibrium curves for various oxygen levels at one atmosphere are shown in FIG. 2. These show that in the temperature range of existing SCR processes, there is a significant limitation on the production of $NO_2$ from NO at any point in the reactor.

The present disclosure takes these facts into account in outlining an SCR process that is more economical than those heretofore disclosed.

Reference may be had to the patent to Tadokoro et al U.S. Pat. No. 4,278,639 for one form of apparatus in which the process of this invention may be carried out. This reference discloses a catalytic converter which comprises a casing having an inlet and an outlet, and at least two separate catalyst carriers within the casing. Different catalysts may be provided in the respective catalyst carriers, preferably a reduction catalyst in the first carrier and an oxidation catalyst in the second. A spacer ring is provided for connecting the catalyst carriers together in longitudinally spaced and aligned relation to each other to provide a single unitary structure of catalyst carriers. A cushioning layer is provided between the unitary structure and the casing. Other U.S. patents of interest in this field are the patents to Retallick 4,301,039; 4,402,871; 4,597,262 and 4,576,800.

The disclosure of the above-mentioned Tadokoro et al patent is incorporated herein by reference.

The use of a plurality of catalysts for treating a fluid stream is known. These may be mixed as in a platinum/rhodium catalyst and applied to a carrier, or they may be separately applied to sequentially disposed carriers as shown in the apparatus of Tadokoro et al supra. The introduction of gas or vapor between sequential catalyst carriers is also known (see Tadokoro et al, supra.).

The improvement in the present invention over the prior art is in the spatial arrangement of different catalysts on sequentially located catalyst carriers and the introduction of ammonia between the catalyst carriers. The first catalyst carrier is provided with an oxidizing catalyst and the second with a catalyst for the reduction of $NO_2$ by $NH_3$. Although such catalysts have previously been used to reduce $NO_x$ in a fluid stream, where ammonia has been used in the system, the ammonia has always been introduced before the fluid inlet into the catalytic converter. The catalyst beds or carriers may be in the same envelope as shown in Tadokoro (supra). or in separate, albeit sequential, envelopes in the same fluid conduit.

This process for treating gas or fluid containing $NO_x$ and $O_2$ with $NH_3$ to obtain principally $N_2$ and $H_2O$ has the following features:

1. Two catalytic reactors or beds in series, one for the oxidation of NO to $NO_2$ in high yield without ammonia present, and the other for the reduction of $NO_2$ with ammonia. Ammonia is injected before the second reactor.

2. Optimization of temperature for each stage. The temperature of the first bed must be low enough for an acceptably high conversion of NO to $NO_2$. Otherwise, the two bed temperatures are conveniently selected on an economic basis to maximize overall $NO_x$ conversion while minimizing side reactions such as the formation of ammonium nitrate or sulfate compounds.

3. Optimization of catalyst for each stage, e.g., noble metal for oxidation, base metal for reduction. The process can utilize whatever catalysts work best. It is not essential that the oxidizing catalyst be from the platinum group nor that the reducing catalyst be from the base metal group although these are preferred.

The net effect of separating the reactions is to reduce significantly the total catalyst volume required for the process, a major cost savings.

The elimination of ammonia presence during the NO oxidation step means that a low temperature consistent with high equilibrium conversion of NO to $NO_2$ may be used, e.g., 100°-200° C., without concern about ammonium nitrate formation.

The feeding of a high proportion of $NO_2$ to NO to the SCR reactor means that a significantly lower temperature and higher space velocity may be used than with NO as the feed reactant. It is possible to consider a catalyst run in the 200°-300° C. range.

BRIEF DESCRIPTION OF THE DRAWINGS

The above-described invention will be better understood by having reference to the annexed drawing wherein.

DETAILED DESCRIPTION OF THE INVENTION

As indicated above, the present invention is characterized by the sequential treatment of a fluid or gas stream containing $NO_x$ and oxygen first with a catalyst for oxidation of the lower oxides of nitrogen in the absence of added ammonia, e.g., NO and $N_2O$ to $NO_2$ and, after ammonia has been introduced into the gas stream secondly with a reducing catalyst to reduce the $NO_2$ content of the stream to nitrogen and water. A tandem type apparatus which may be used is shown in the above-identified U.S. patent to Tadokoro et al. As indicated above, a sequential system where isolated catalyst containers which are connected to the same fluid flow line may be used, especially so in large stationary power plants.

Figure 1:
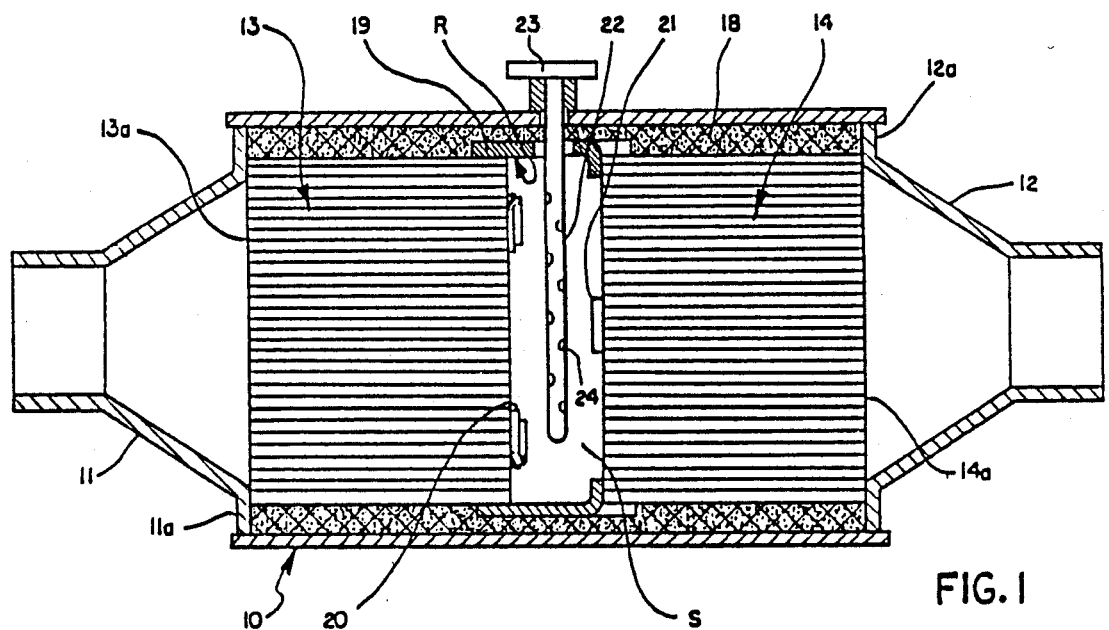
FIG. 1 is a view in cross-section showing one form of a catalytic converter useful in the practice of the present invention.
Figure 2:
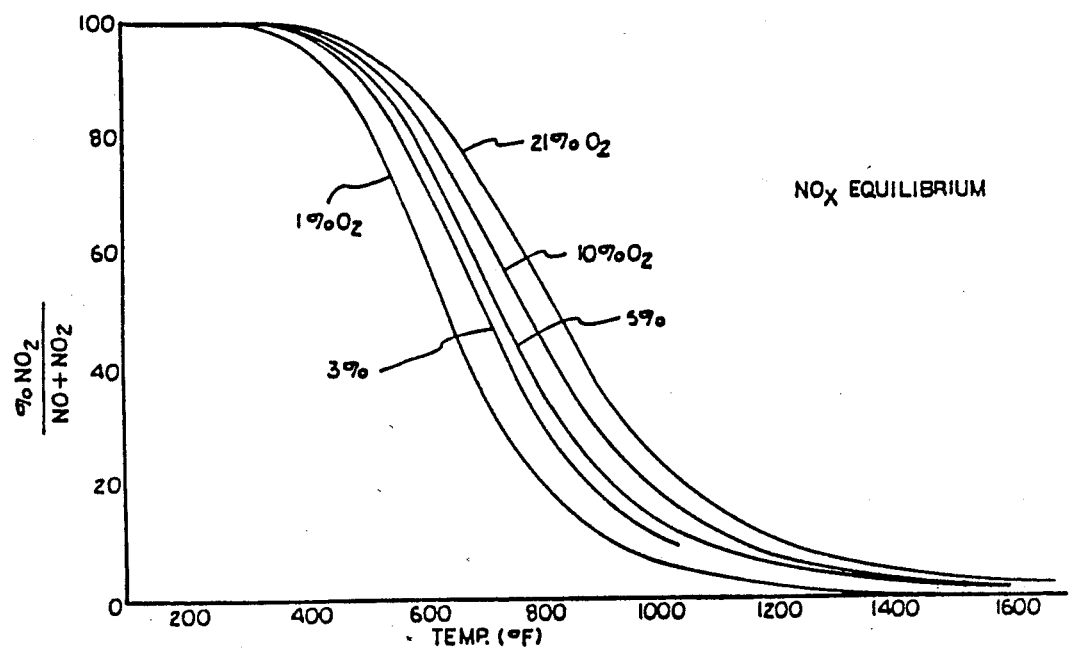
FIG. 2 is a graph showing $NO_x$ equilibria at different $O_2$ levels.

With reference to FIG. 1, there is shown the apparatus illustrated in Tadokoro et al. The casing 10 in the embodiment shown in FIG. 1, has a cylindrical configuration in cross-section and has opposite ends to which the frustoconical closure members 11 and 12 are rigidly secured as by welding outwardly protruding flanges 11a and 12a of the respective closure members 11 and 12 to the casing 10. It should be noted that the outwardly protruding flanges 11a and 12a have an inner diameter smaller than the diameter of the honeycomb type catalyst carriers 13 and 14. As is well known in the art, the honeycomb type catalyst carriers are generally made of a porous inert solid refractory material, or metallic material, having parallel closely adjacent flow passages 13a and 14a defined therein and extending throughout the longitudinal extent thereof. The catalyst carriers 13 and 14 have a selective catalyst deposited on the surface of macropores or micropores (as in a calcined alumina wash coat) communicating with the flow passages 13a and 14a. The catalyst is applied by spraying a aqueous solution of the catalyst metal or metals onto the substrate and calcining at about 800° C. to 900° C. The catalyst carrier 13 according to the present invention is provided with a noble metal catalyst, e.g., platinum or palladium or a mixture of the two noble metal catalysts. The catalyst carrier 14 is provided with either a noble metal or a base metal catalyst, or a mixture of two or more catalysts. The order in which the gas contacts these catalysts is critical to the present invention.

The catalyst carriers 13 and 14 are sequentially mounted within the casing 10 in longitudinally spaced relation with a single cushioning layer 18 positioned between the outer peripheral surfaces of the respective catalyst carriers 13 and 14 and the wall of the casing 10. The catalyst carriers 13 and 14 are connected together within the casing 10 and maintained in spaced relation by means of a spacer ring identified by R and formed of steel.

The spacer R is desirably an annular ring body 19 having an inner diameter equal to or slightly larger than the diameter of the catalyst carriers 13 and 14 and an outer diameter smaller than the inner diameter of the casing 10. The annular ring body 19 has two sets of two or more, for example, stop pawls 20 and 21 positioned within the interior of the annular ring body 19 at a location spaced a certain distance from the respective end extremity of the annular ring body 19. These stop pawls 20 and 21 of these sets are alternately positioned one after the other in a circumferential direction.

An ammonia supply nozzle 22 is provided having one end flanged at 23 and situated externally of the casing 10 and the other end protruding into the space 5 between the catalyst carriers 13 and 14. The tube 22 is provided with a plurality of openings 23 to admit ammonia into the gas stream and to stir the gases prior to entry into the catalytic carrier 14. The ammonia used may be 100% ammonia or it may be diluted with an inert gas such as $CO_2$. I prefer to use commercial ammonia gas.

Instead of attempting to catalyze the oxidation of lower oxides of nitrogen and the reduction of $NO_2$ to nitrogen and water simultaneously in the presence of ammonia as has been done in the prior art, I carry out these reactions sequentially. Thus, in catalyst carrier 13, the catalyst is a noble metal and residual oxygen in the effluent gas is caused to combine with the lower oxides of nitrogen in the absence of added ammonia to oxidize them to $NO_2$. This oxidation takes place in accordance with equation (2) above.

At this point ammonia is added to the gas stream through the perforated tube 22, and the gas stream is thoroughly mixed and flows into the catalytic carrier 14 where the $NO_2$ is reduced to nitrogen water in accordance with formula (3) above.

Although the Tadokoro reactor as modified is a suitable reactor for use herein, it should be understood that in this system the reaction temperature is essentially the same in each zone as is the space velocity, and to that extent illustrates a special case of this invention. It appears that this invention is useful on a larger scale with the larger separate reactors which may be run at different temperatures and/or space velocities.

The following specific examples are illustrative of the invention:

The selective catalytic reaction was run in laboratory tests that used a standard feed gas and two types of catalytic converter. Feed gas composition is shown in Table 1.

TABLE 1

| Component | |
|---|---|
| NO, ppm | 500 |
| $O_2$, % | 6 |
| $CO_2$, % | 10 |
| $H_2O$, % | 10 |
| $N_2$ | bal. |

Catalytic converters were of a monolith type based on a corrugated stainless-steel structure coated with a washcoat and further coated with catalytic materials, as generally described above. Each converter used in these tests had a cell density of approximately 160 cells/sq. in. and outside dimensions of 1 in. diam. and 3.5 or 7.0 in. length. Catalyst A consists of Pt impregnated on porous alumina at about 40 gm/cu. ft. Pt loading, and is 3.5 in. long. Catalyst B consists of $V_2O_5/TiO_2$ in a metal ratio of approximately V/Ti=1/19, and is 7.0 in. long.

In the test unit, converters are maintained at the designated temperature by external heaters, ammonia is injected in a 1:1 mol ratio to NO, and gas flow is set to give space velocities (vol./hr per vol. converter) of 20,000 $hr^{-1}$ and 10,000 $hr^{-1}$ for catalysts A and B respectively.

EXAMPLE 1

The feasibility of an isothermal two-stage system at 200 C is demonstrated with two A converters; results are given in Table 2.

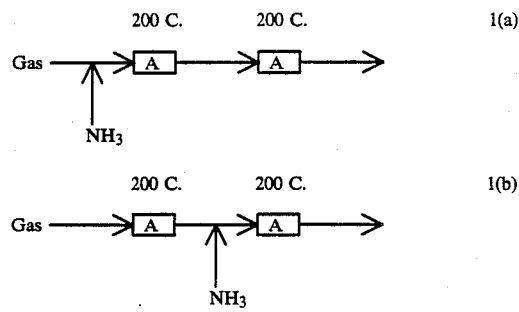

TABLE 2

| Test | ppm $NO_x$ in exit |
|---|---|
| 1(a) | 25 |
| 1(b) | 10 |

As apparent from comparison of 1(a) and 1(b), overall conversion of $NO_x$ is superior when NO is converted to $NO_2$ prior to $NH_3$ injection.

EXAMPLE 2

The feed gas with the $\%NO_2$ of total $NO_x$ varied from about 100 to 50 to 0% is treated at the same SCR conditions in tests 2(a), 2(b), and 2(c) respectively. Results are shown in Table 3.

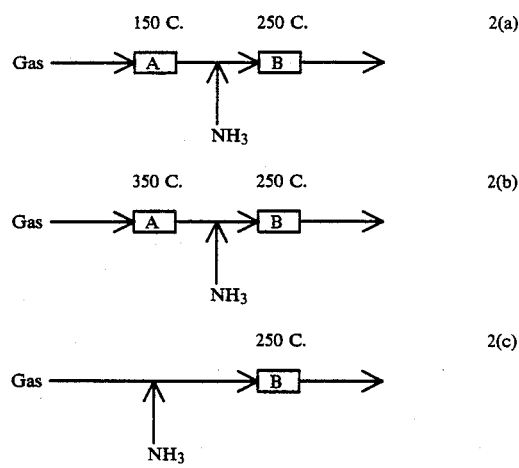

TABLE 3

| Test | ppm $NO_x$ in exit |
|---|---|
| 2(a) | 10 |
| 2(b) | 20 |
| 2(c) | 40 |

Comparison of tests 2(a), (b), and (c) shows that it is preferable to convert NO completely to $NO_2$ rather than part way (about 50% in 2(b)). This performance may be translated into lower operating temperature or higher space velocity, as the system warrants.

I claim:

1. A process for removing nitrogen oxides, including NO and NO$_2$, from a gas stream containing free oxygen and converting them to nitrogen and water which comprises the steps of contacting said gas stream with an oxidation catalyst in a first zone in the substantial absence of added ammonia under reaction conditions effective to substantially convert the NO present in said gas stream to NO$_2$, and thereafter contacting the gas stream from said first zone with a reduction catalyst in a second zone under reaction conditions effective to reduce the NO$_2$ present in said gas stream to nitrogen and water.

2. A process as defined in claim 1 wherein the gas temperature in said first zone is at least about 100° C.

3. A process as defined in claim 1 wherein the gas temperature in said first zones is from about 100° C. to about 400° C.

4. A process as defined in claim 1 wherein the gas temperature in said second zone is at least about 175° C.

5. A process as defined in claim 1 wherein the gas temperature in said second zone is about 175° C. to about 400° C.

6. A process as defined in claim 1 wherein the gas temperature in said first zone is from about 100° C. to 400° C. and the temperature in said second zone is from about 175° C. to about 400° C.

7. A process as defined in claim 1 wherein the oxidation catalyst is platinum.

8. A process as defined in claim 1 wherein the oxidation catalyst is a mixture of platinum and rhodium.

9. A process as defined in claim 1 wherein the oxidation catalyst is palladium.

10. A process as defined in claim 1 wherein the oxidation catalyst is a mixture of palladium and rhodium.

11. A process as defined in claim 1 wherein the reduction catalyst is a metal or metal oxide.

12. A process as defined in claim 11 wherein the metal or metal oxide is or includes a metal selected from Group IV or Group V of the Periodic Table.

13. A process as defined in claim 12 wherein the metal oxide is titanium dioxide.

14. A process as defined in claim 12 wherein the metal oxide is vanadium pentoxide.

15. A process as defined in claim 11 wherein the metal oxide is a mixture of at least two base metal oxides.

16. A process as defined in claim 11 wherein the metal or metal oxide is a noble metal.

17. A process as defined in claim 15 wherein the mixture of at least two base metal oxides is a mixture of vanadium pentoxide and titanium dioxide.

18. A process as defined in claim 17 in which the metal ratio of the vanadium to the titanium is about 1:5 to about 1:30.

19. A process as defined in claim 15 wherein the mixture of at least two base metal oxides is a mixture of ceria, alumina, vanadia and titania.

20. A process as defined in claim 18 in which the metal ratio is 1:19.

21. A process as defined in claim 1 in which the ratio of the space velocity of the gas in the first zone to the space velocity of the gas in the second zone is from about 5:1 to 1:5.

22. A process as defined in claim 21 in which the ratio is about 2:1.

23. A process as defined in claim 1 in which the space velocity of the gas passing through the first zone is in the range of from about 10,000 hr$^{-1}$ to about 60,000 hr$^{-1}$.

24. A process as defined in claim 1 in which the space velocity of the gas passing through the zone is in the range of from about 5000 hr$^{-1}$ to about 20,000 hr$^{-1}$.

25. A process as defined in claim 1 in which the space velocity of the gas passing through the first zone is about 20,000 hr$^{-1}$ and the space velocity of the gas passing through the second zone is about 10,000 hr$^{-1}$.

26. A process as defined in claim 1 in which the molar ratio of added ammonia to nitrogen oxides collectively is about 0.7:1 to 1.3:1.

27. A process as defined in claim 1 in which the oxidation catalyst is in the form of a fixed bed.

28. A process as defined in claim 1 in which the oxidation catalyst is supported on porous alumina.

29. A process as defined in claim 1 in which the reducing catalyst is in the form of a fixed bed.

30. A process as defined in claim 1 in which the reducing catalyst is supported on porous alumina.

31. A process as defined in claim 28 in which the porous alumina is supported in turn on a metal substrate.

32. A process as defined in claim 30 in which the porous alumina is supported in turn on a metal substrate.

33. A process as defined in claim 1 in which each of the zones is subdivided into a plurality of cells and the catalyst is supported on the walls of said cells.

34. A process as defined in claim 33 in which the density of the cells is in the range of from about 100 to about 400 cells per square inch.

* * * * *

UNITED STATES PATENT AND TRADEMARK OFFICE
CERTIFICATE OF CORRECTION

PATENT NO. : 4,912,776
DATED : March 27, 1990
INVENTOR(S) : William R. Alcorn

It is certified that error appears in the above-identified patent and that said Letters Patent is hereby corrected as shown below:

Column 7:
Claim 1, line 8, after "$NO_2$," please insert ---adding ammonia to said gas as it leaves said first zone,---

Signed and Sealed this

Second Day of March, 1993

Attest:

STEPHEN G. KUNIN

*Attesting Officer*    Acting Commissioner of Patents and Trademarks